United States Patent [19]

Dunnigan et al.

[11] Patent Number: 4,641,013
[45] Date of Patent: Feb. 3, 1987

[54] DUAL STAGE THERMOSTAT AND ELECTRIC SPACE HEATING SYSTEM

[75] Inventors: Gerald Dunnigan, Brantford; Ardeshir Bandari, West Vancouver, both of Canada

[73] Assignee: Westcan Manufacturing Ltd., Vancouver, Canada

[21] Appl. No.: 561,486

[22] Filed: Dec. 14, 1983

[30] Foreign Application Priority Data

Mar. 4, 1983 [CA] Canada ................ 422882

[51] Int. Cl.⁴ .................. H05B 1/02; G05D 23/10; H01H 37/12; H01H 37/54
[52] U.S. Cl. .................. 219/364; 219/501; 219/508; 219/510; 236/47; 337/338; 337/361
[58] Field of Search ............ 219/364, 494, 501, 510, 219/512, 515, 379, 508; 236/47, 68 B; 337/337, 338, 340, 361, 363; 374/11, 112, 114

[56] References Cited

U.S. PATENT DOCUMENTS

| | | | |
|---|---|---|---|
| 2,526,566 | 10/1950 | Kolisch | 219/510 |
| 2,888,537 | 5/1959 | Mears | 337/338 |
| 2,930,874 | 3/1960 | Andrews | 337/338 |
| 2,951,640 | 9/1960 | Buchanan | 219/364 |
| 3,180,999 | 4/1965 | Kuykendall | 219/508 |
| 3,247,358 | 4/1966 | Schmidt | 219/501 |
| 3,254,184 | 5/1966 | Huffman et al. | 337/363 |
| 3,339,043 | 8/1967 | Baak | 236/68 B |
| 3,385,957 | 5/1968 | Munson et al. | 219/501 |
| 3,421,131 | 1/1969 | Moyer et al. | 337/338 |
| 3,585,363 | 6/1971 | Price | 219/494 |
| 3,610,886 | 10/1971 | Pansing et al. | 219/364 |
| 3,882,728 | 5/1975 | Wittlinger | 374/112 |
| 3,945,564 | 3/1976 | Smallegan | 236/68 B |
| 4,085,309 | 4/1978 | Godel et al. | 219/364 |
| 4,112,406 | 9/1978 | Hickling | 337/338 |
| 4,215,268 | 7/1980 | Dinkel | 219/501 |
| 4,252,270 | 2/1981 | Taylor et al. | 236/47 |
| 4,323,761 | 4/1982 | Hubner | 219/364 |
| 4,524,908 | 6/1985 | Marshall et al. | 236/68 B |

FOREIGN PATENT DOCUMENTS

| | | | |
|---|---|---|---|
| 2233704 | 1/1974 | Fed. Rep. of Germany | 219/501 |
| 3021557 | 1/1982 | Fed. Rep. of Germany | 219/501 |

*Primary Examiner*—A. D. Pellinen
*Assistant Examiner*—Geoffrey S. Evans
*Attorney, Agent, or Firm*—Rogers, Bereskin & Parr

[57] ABSTRACT

A dual stage thermostat for an electrical space heating system in which there are two microswitches connected in parallel and operated by a common bimetallic strip. The first switch when closed connects a heating element to a power supply through a diode which reduces by half the power applied to the element. The second switch when closed connects the heating element directly to the power supply. The temperature at which the second switch opens is set about 1.5° F. lower than that at which the first switch opens. Thus, as the room temperature approaches the desired temperature, the heater element is switched from full to half power, producing less temperature overshoot and saving energy. The thermostat may be used with any standard two wire heater.

9 Claims, 5 Drawing Figures ated 4,641,013

DUAL STAGE THERMOSTAT AND ELECTRIC SPACE HEATING SYSTEM

This invention relates to a dual stage thermostat for an electrical space heater and to an electrical space heating system having a dual stage thermostat.

Electrical space heating systems employing heaters such as base board heaters are well known. Such systems are normally simply on-off systems in that when the temperature falls below the set temperature at the thermostat, the heating element turns on and when the temperature drops below the thermostat set temperature, the heating element turns off. Such systems commonly produce large temperature variations in the space being heated. Therefore the occupants of a room in which such a system is located tend to perceive a wave of heat when the heating element turns on and a cold sensation when the heating element turns off and when the temperature is dropping to the set temperature.

In addition, the thermostat for a space heater such as a base board heater is normally located half way between the floor and the ceiling of the room in which the heater is located. The applicant's tests have determined that by the time the air temperature at the thermostat has risen to the set temperature, the temperature at the ceiling has risen well above the set temperature. Since heat loss varies exponentially with the interior temperature, the overshoot results in a substantial waste of heat.

Accordingly, it is an object of the present invention in one of its aspects to provide a dual level thermostat in which the tendancy for the temperature to overshoot the desired set point is reduced. To this end, the invention in one of its aspects provides a dual level thermostat for an electrical space heater comprising:

(a) first temperature dependent electrical switch means operable between open and closed conditions dependent upon the temperature at said first switch means and including first adjustment means for varying the temperature setting at which said first switch means changes between open and closed conditions, said first switch means having first and second terminal means, (b) second temperature dependent electrical switch means operable between open and closed conditions dependent on the temperature at said second switch means and including second adjustment means for varying the temperature setting at which said second switch means changes between open and closed conditions, said second switch means having third and fourth terminal means, (c) said first switch means being set to open at a first temperature and said second switch means being set to open at a second temperature slightly below said first temperature, (d) fifth terminal means connected to said first and third terminal means, (e) waveform blocking means connected between said second and fourth terminal means, and being adapted to pass only a portion of a wave form applied thereto, (f) sixth terminal means connected to said fourth terminal means and separated from said second terminal means by said waveform blocking means, (g) means adapted to connect one of said fifth and sixth terminal means to one terminal of said space heater and to connect the other of said fifth and sixth terminal means to an AC power supply, so that when the temperature is below said second temperature, full power will be available at said one of said fifth and sixth terminals and when the temperature is between said first and second temperatures, only a portion of the power available from said AC power supply will be available at said one of said fifth and sixth terminals.

In another of its aspects the invention provides an electrical space heating system comprising:

(1) an electrical space heater having a single heater element of at least 500 watts, (2) and a dual level thermostat connected to said heater, said thermostat comprising:

(a) first temperature dependent electrical switch means operable between open and closed conditions dependent upon the temperature at said first switch means and including first adjustment means for varying the temperature setting at which said first switch means changes between open and closed conditions, said first switch means having first and second switch terminal means, (b) second temperature dependent electrical switch means operable between open and closed conditions dependent on the temperature at said second switch means and including second adjustment means for varying the temperature setting at which said second switch means changes between open and closed conditions, said second switch means having third and fourth switch terminal means, (c) said first switch means being set to open at a first temperature and said second switch means being said to open at a second temperature slightly below said first temperature, (d) fifth terminal means connected to said first and third terminal means, (e) waveform blocking means connected between said second and fourth terminal means, and being adapted to pass only a portion of a waveform applied thereto, (f) sixth terminal means connected to said fourth terminal means and separated from said second terminal means by said waveform blocking means, (g) means adapted to connect one of said fifth and sixth terminal means to one terminal of said space heater and to connect the other of said fifth and sixth terminal means to an AC power supply, so that when the temperature is below said second temperature, full power will be available at said one of said fifth and sixth terminals and when the temperature is between said first and second temperatures, only a portion of the power available from said AC power supply will be available at said one of said fifth and sixth terminals.

Further objects and advantages of the invention will appear from the following disclosure taken together with the accompanying drawings in which.

Figure 1:
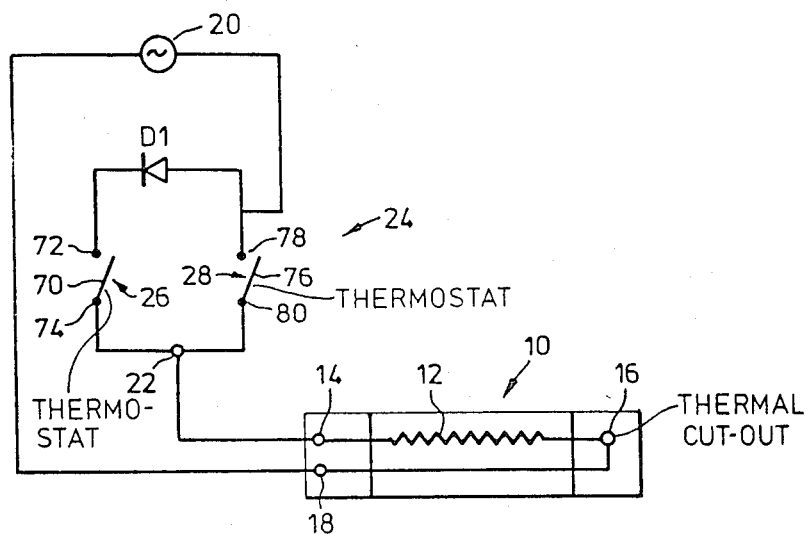
FIG. 1 is an electrical schematic view of a space heating system employing a dual stage thermostat according to the invention.

Reference is first made to FIG. 1, which shows a standard baseboard heater 10 having a heating element 12. One end of the heating element 12 is connected to a terminal 14 and the other end is connected through a thermal cutout device 16 (to prevent overheating) to another terminal 18. Terminal 18 is connected to one side of a standard 120 volt or 240 or 277 volt AC power supply 20, while the other terminal 14 is connected to terminal 22 of a dual level thermostat 24.

Figure 2:
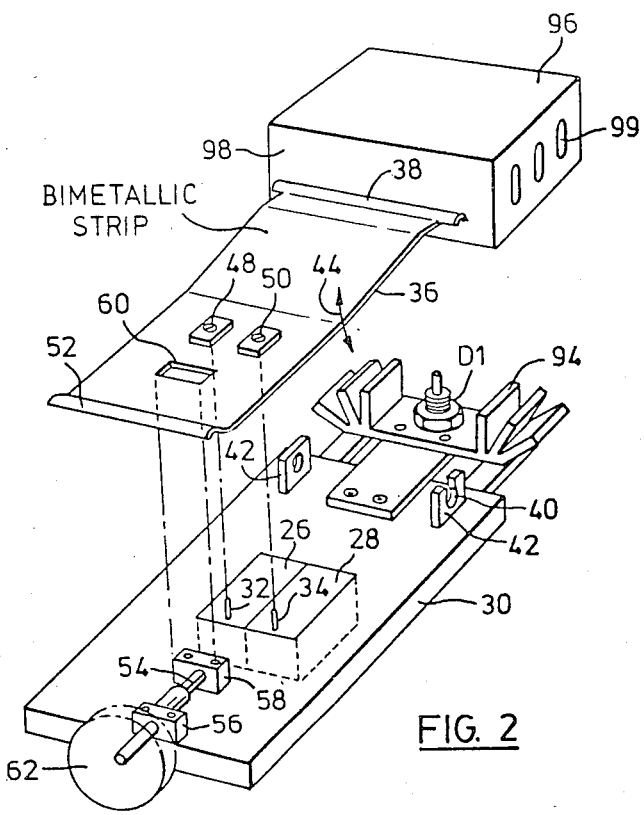
FIG. 2 is a perspective exploded view of a thermostat according to the invention.
Figure 3:
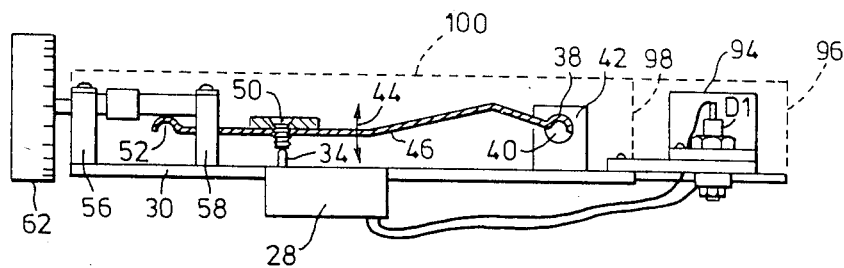
FIG. 3 is a side view of the FIG. 2 thermostat.

The thermostat includes first and second temperature dependent thermostat switches 26, 28. Each switch 26, 28 is a standard 20 ampere microswitch mounted (see FIGS. 2,3) on a metal base 30. The microswitches 26, 28 have respective contact plungers 32, 34 which are adapted to be depressed by a common bi-metallic strip 36 mounted on the base 30. The bi-metallic strip 36 has one end formed in a rounded edge 38, the ends of which project into holes 40 in posts 42 on the base. The strip 38 thus pivots about edge 38 as indicated by arrow 44 in FIG. 3. A flat portion 46 of strip 36 contains two adjusting screws 48, 50, one for each microswitch 26, 28. The lower ends of screws 48, 50 rest on the tops of the plungers 32, 34, which are biased by springs (not shown) to their uppermost position.

The other end of the bi-metallic strip 36 has an upwardly projecting edge 52. An eccentric shaft 54 extends over edge 52 and is supported by two posts 56, 58, one of which (post 58) protrudes through a hole 50 in strip 36. A temperature setting knob 62 is connected to shaft 54. The shaft 54 holds the strip 36 such that the ends of screws 48, 50 lie against microswitch plungers 32, 34 with some pressure. As knob 52 is turned, the strip 36 moves upwardly or downwardly in the direction of arrow 44, thus controlling the amount of distortion which the bi-metallic strip 38 must undergo before the microswitches 26, 28 change their operating condition from open to closed, and thereby changing the set temperature of the thermostat.

As shown in FIG. 1, the microswitch 26 includes a switch element 70 and terminals 72, 74. The microswitch 28 includes a switch element 76 and terminals 78, 80. The terminals 74, 80 are connected together and to the terminal 22 which in turn is connected to the terminal 14 of the heating element 10.

The microswitch terminals 72, 78 are connected together through a diode D1. In addition, terminal 78 is connected to the AC power supply 20.

In operation, the temperature at which switch element 76 changes from closed to open condition is set about 1.5° F. lower than the corresponding turn-off temperature for switch element 70. This is accomplished by positioning the bottom of adjusting screw 50 slightly below the bottom of adjusting screw 48 (the microswitches are "on" when their plungers are raised and "off" when their plungers are depressed). The temperature at which switch 70 opens is marked as the "set" temperature on the knob 62.

The operation of the system described is as follows. Assume that the room is cold and that the thermostat has just been turned up. In that event, both switches 70, 76 close and full power from the power supply 20 is applied to the heating element 12 which turns on fully. When the temperature at the thermostat 24 reaches 1.5° F. below the set temperature, switch 76 opens. The power applied to the heating element 12 must now pass fully through the diode D1, which halfwave rectifies the current, reducing the power level by about 50 percent, ignoring diode losses. The heating element 12 now operates at half wattage, providing a slower and smoother approach to the set temperature and reducing undesired overshoot. If the heat losses from the room are so high that the half wattage applied to the heater is insufficient to maintain the room temperature above the open temperature of switch 76, then as the room temperature falls, the switch 76 closes and full power is again applied to the heater element 12.

After the room reaches the set temperature, switch 70 opens so that the switches 70, 76 are now open. Although the heater element 12 is now fully turned off, a slight temperature overshoot may occur, because of heat stored in heater 12. However, the room temperature will soon begin to fall. When the temperature reaches the set point of the thermostat 24 (which is the turn-on or closing temperature for switch 70), switch 70 closes, again applying half power to the heating element 12. If this is sufficient to raise the temperature to the desired temperature, then a slow smooth approach to the desired temperature occurs. If heat losses from the room are higher than can be offset by the half power applied to the heating element 12, then the room temperature continues to fall another 1.5° F. to the turn on temperature of switch 76. Switch 76 then turns on, again applying 100 percent power to the heating element 12 to raise the room temperature back to the turn-off temperature of switch 76.

Figure 4:
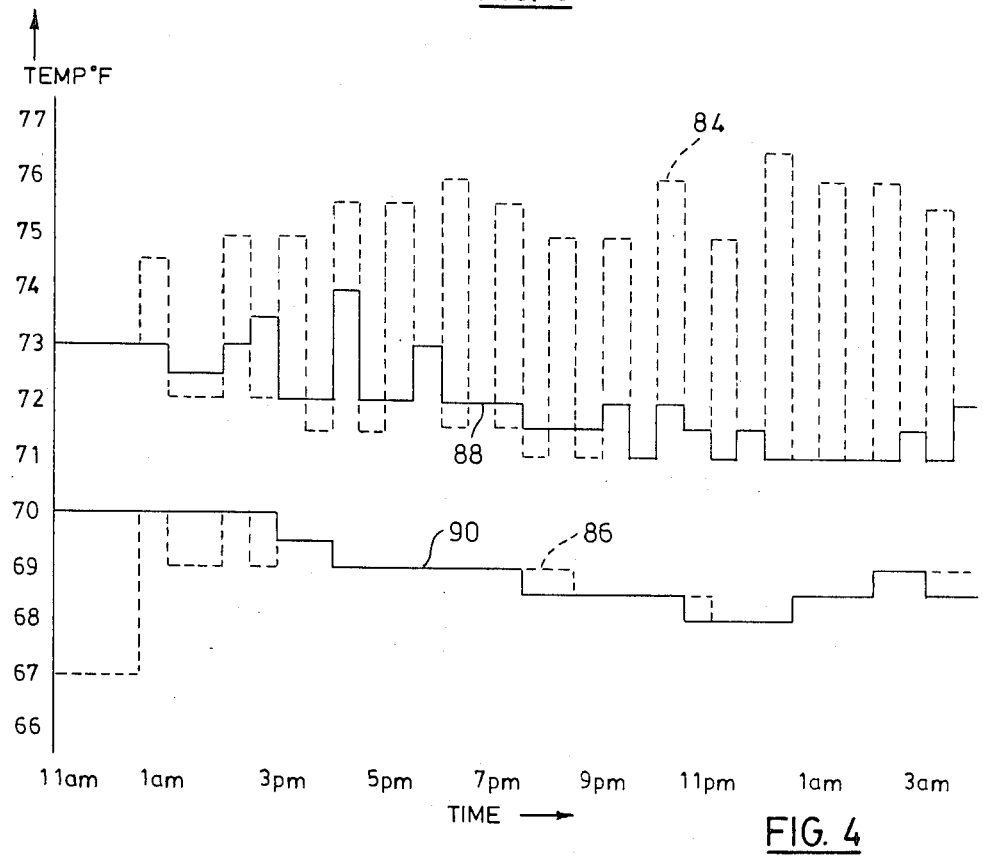
FIG. 4 shows temperature variations using a standard thermostat system and using a dual stage thermostat.

To test the advantages of the system described, two identical rooms in a side-by-side duplex were used for test purposes. One room was equipped with an 8-foot 2,000 watt conventional baseboard heater and thermostat. The second room was equipped with an 8 foot 2,000 watt two element heater and dual stage thermostat. The equipment used in the second room differed from that shown and described above in that the heater employed two heating elements instead of one and the thermostat contained two switches, one to turn on each heating element. However, one switch was set to turn on 1.5° F. below the other, as described for the present invention. Both thermostats were set at 68° F. and were mounted on corresponding walls adjacent to the walls on which the heaters were mounted. Each thermostat was four meters from its heater. FIG. 4 shows the temperatures at ceiling level and at floor level. The ceiling level and floor level temperatures in the room using the conventional heater are indicated in dotted lines at 84, 86 respectively, and the corresponding temperatures using the two stage heating system are shown in full lines at 88, 90 respectively. It will be seen that the temperature differences between the two systems at floor level are relatively minor, but that the temperature differences at ceiling level are quite large. FIG. 4 shows only part of the duration of the test. During the complete test the floor temperature ranged between 66.5° F. and 70° F. using the conventional system and between 66° F. and 70° F. with the invention. The temperature at the ceiling ranged between 70.5° F. and 76.5° with the conventional system and between 70° F. and 73.5° F. with the invention.

The test was carried out for a duration of 38.33 hours, and because the outdoor ambient temperature was not particularly low (between 40° and 50° F.) the two stage heater was not required to operate frequently at its full capacity. It operated at half-wattage for 37.33 hours and at full wattage for 0.37 hours whereas the conventional heater operated at full wattage for 21.98 hours. Calculations indicated that the power consumption of the two stage heater during the tests was 29.31 kilowatt hours and for the conventional heater was 34.29 kilowatt hours. An energy saving of approximately 14.5 percent was therefore achieved. In addition, since the deviation from the desired temperature was smaller in the room equipped with the dual stage heater, the comfort level of the room was increased.

Since the diode D1 will dissipate a reasonably substantial quantity of heat, it is important that it be isolated thermally from the temperature sensing bimetallic strip 36 in order to avoid a temperature "setback" of the thermostat as operation of the thermostat continues. Therefore, as shown, the diode D1 is mounted on a relatively massive finned heat sink or metal plate 94 to dissipate heat. The heat sink 94 is located in a housing 96 which is isolated from the bi-metallic strip 36 by wall 98 of the housing 96. In addition, the housing 96 is ventilated by holes 99. The microswitches 26, 28 and bimetallic strip 36 are enclosed by a separate housing 100. This arrangement minimizes any heat which may reach the bi-metallic strip 36 from the diode D1.

Figure 5:
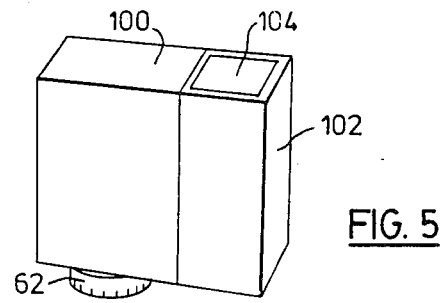
FIG. 5 shows a modified housing arrangement for a thermostat according to the invention.

Preferably the diode D1 is, as shown in FIG. 5, mounted in a separate housing 102 at the side of the housing 100 which holds the remainder of the thermostat 24. The housing 102 is open at its top and bottom as indicated at 104 (it may be screened at its top and bottom by screen elements, not shown, in order to prevent unauthorized entry of fingers and tools) so that a chimney effect will be produced. Thus a column of air will rise through the housing 102, cooling the diode D1 and ensuring that there is a minimal heat transfer from the diode to the housing.

Because the diode D1 is switching large electrical currents (typically between 10 and 20 amperes per heater) on and off, radio frequency interference (RFI) was thought to be a serious problem in a home or building equipped with heaters of the invention. Therefore, tests were conducted in a 3,000 square foot residential unit equipped with six thermostats according to the invention and eight large baseboard heaters. Surprisingly, no RFI was detected in spite of the large currents being switched by the diode.

A Fourier analysis of the waveforms produced by the current switching yielded the following results, as shown in Table I below:

TABLE I

| Frequency (Hz) | Peak Amplitude (volts) |
| --- | --- |
| 0 (dc) | 53 |
| 60 | 85 |
| 120 | 36 |
| 240 | 6.4 |
| 360 | 3.1 |
| 480 | .84 |
| 600 | .54 |
| 720 | .37 |
| 840 | .27 |
| 960 | .21 |
| 1080 | .18 |
| 1200 | .13 |
| 1320 | .11 |
| 1440 | .09 |
| 1560 | .08 |

All of the components listed above except those at 0 and 60 Hz are unwanted. The main problem is the harmonic at 120 Hz having a peak amplitude of 36 volts. However, it was found that no particular shielding or low-pass filtering was required so long as the circuits used were well-grounded.

Although a diode has been shown as the preferred method for reducing the power applied to the heating element, other waveform blocking devices may also be used if desired. The set temperature difference between the two switches used may also be varied if desired from the 1.5° F. described. A preferred range for such difference is between 1.5° F. and 2.5° F.

A major advantage of the system described is that a conventional baseboard or other electrical space heater may be used, having only a single element with two wires running thereto. Therefore, the system of the invention may be retrofitted to conventional systems simply by changing the thermostat. No special or additional wiring is required in order to achieve the advantage of the invention.

We claim:

1. A dual level thermostat for an eletrical space heater comprising:
   (a) first temperature dependent electrical switch means operable between open and closed conditions dependent upon the temperature at said first switch means and including first adjustment means for varying the temperature setting at which said first switch means changes between open and closed conditions, said first switch means having first and second terminal means,
   (b) second temperature dependent electrical switch means operable between open and closed conditions dependent on the temperature at said second switch means and including second adjustment means for varying the temperature setting at which said second switch means changes between open and closed conditions, said second switch means having third and fourth terminal means,
   (c) said first switch means being set to open at a first temperature and said second switch means being set to open at a second temperature slightly below said first temperature,
   (d) fifth terminal means connected to said first and third terminal means.
   (e) a diode means connected between said second and fourth terminal means,
   (f) sixth terminal means connected to said fourth terminal means and separated from said second terminal means by said diode means,
   (g) means adapted to connect one of said fifth and sixth terminal means to one terminal of said space heater which space heater includes another terminal for connection to an AC power supply and adapted to connect the other of said fifth and sixth terminal means to said AC power supply,
   so that when the temperature is below said second temperature full power will be available at said one of said fifth and sixth terminals and when the temperature is between said first and second temperatures, only approximately one-half of the power will be available at said one of said fifth and sixth terminals.

2. A dual level thermostat as claimed in claim 1, which includes:
   (i) a housing, in which the first and second switch means and the diode means are mounted;
   (ii) a bimetallic strip means, pivotally mounted at one end within the housing, and abutting the first and second adjustment means between said one end and another end of the bimetallic strip means;

(iii) operating temperature adjustment means mounted in the housing and controlling displacement of the other end of the bimetallic strip means; and (iv) a heat sink within the housing, on which the diode means is mounted.

3. A thermostat according to claim 1 wherein said first and second switch means are mounted in a first housing and said diode means is mounted on a heat sink, said heat sink being mounted in a second housing separated from said first housing.

4. A thermostat according to claim 3 where said second housing has opening therein to allow air to circulate therethrough.

5. A thermostat according to claim 4 wherein said second housing is mounted at the side of said first housing and has openings at the top and bottom thereof for air to flow upwardly therethrough.

6. A thermostat according to claim 1 wherein the difference between said first and second temperatures is between approximately 1.5° F. and 2.5° F.

7. A space heating system comprising:
(1) an electrical space heater having a single heater element of at least 1,000 watts,
(2) and a dual level thermostat connected to said heater, said thermostat comprising:
(a) first temperature dependent electrical switch means operable between open and closed conditions dependent upon the temperature at said first switch means and including first adjustment means for varying the temperature setting at which said first switch means changes between open and closed conditions, said first switch means having first and second terminal means,
(b) second temperature dependent electrical switch means operable between open and closed conditions dependent on the temperature at said second switch means and including second adjustment means for varying the temperature setting at which said second switch means changes between open and closed conditions, said second switch means having third and fourth terminal means,
(c) said first switch means being set to open at a first temperature and said second switch means being set to open at a second temperature slightly below said first temperature,
(d) fifth terminal means connected to said first and third terminal means,
(e) a diode means connected between said second and fourth terminal means,
(f) sixth terminal means connected to said fourth terminal means and separated from said second terminal means by said diode means,
(g) means adapted to connect one of said fifth and sixth terminal means to one terminal of said space heater which space heater includes another terminal for connection to an AC power supply and adapted to connect the other of said fifth and sixth terminal means to said AC power supply,
so that when the temperature is below said second temperature, full power will be available at said one of said fifth and sixth terminals and when the temperature is between said first and second temperatures, only approximately one-half of the power available from said AC power supply will be available at said one of said fifth and sixth terminals.

8. A space heating system comprising:
(1) an electrical space heater having a single heater element of at least 500 watts,
(2) and a dual level theremostat connected to said heater, said thermostat comprising:
(a) first temperature dependent electrical switch means operable between open and closed conditions dependent upon the temperature at said first switch means and including first adjustment means for varying the temperature setting at which said first switch means changes between open and closed conditions, said first switch means having first and second terminal means,
(b) second temperature dependent electrical switch means operable between open and closed conditions dependent on the temperature at said second switch means and including second adjustment means for varying the temperature setting at which said second switch means changes between open and closed conditions, said second switch means having third and fourth terminal means,
(c) said first switch means being set to open at a first temperature and said second switch means being said to open at a second temperature slightly below said first temperature,
(d) fifth terminal means connected to said first and third terminal means,
(e) a diode means connected between said second and fourth terminal means, and being adapted to pass only a portion of a waveform applied thereto,
(f) sixth terminal means connected to said fourth terminal means and separated from said second terminal means by said diode means,
(g) means adapted to connect one of said fifth and sixth terminal means to one terminal of said space heater which space heater includes another terminal for connection to an AC power supply and adapted to connect the other of said fifth and sixth terminal means to said AC power supply,
so that when the temperature is below said second temperature, full power will be available at said one of said fifth and sixth terminals and when the temperature is between said first and second temperatures, only approximately one-half of the power is available from said fifth and sixth terminals.

9. A dual level thermostat for an electrical space heater comprising:
(a) first temperature dependent electrical switch means operable between open and closed conditions dependent upon the temperature at said first switch means and including first adjustment means for varying the temperature setting at which said first switch means changes between open and closed conditions, said first switch means having first and second terminal means,
(b) second temperature dependent electrical switch means operable between open and closed conditions dependent on the temperature at said second switch means and including second adjustment means for varying the temperature setting at which said second switch means changes between open and closed conditions, said second switch means having third and fourth terminal means,
(c) said first switch means being set to open at a first temperature and said second switch means being set to open at a second temperature slightly below said first temperature, (d) fifth terminal means connected to said first and third terminal means,
(e) a diode means connected between said second and fourth terminal means,
(f) sixth terminal means connected to said fourth terminal means and separated from said second terminal means by said diode means,
(g) means adapted to connect one of said fifth and sixth terminal means to one terminal of said space heater which space heater includes another terminal for connection to an AC power supply and adapted to connect the other of said fifth and sixth terminal means to said AC power supply, so that when the temperature is below said second temperature, full power will be available at one of said fifth and sixth terminals and when the temperature is between said first and second temperatures, only approximately one-half of the power available from said AC power supply will be available at said one of said fifth and sixth terminals,
(h) a first housing, in which the first and second switch means are mounted,
(i) a heat sink on which said diode means is mounted, and
(j) a second housing, in which the heat sink and the diode means are housed, and which includes openings at the top and bottom thereof, for air to flow upwardly therethrough.

* * * * *